H. T. Woodman.
Water Cooler.

N°. 58,530.                                            Patented Oct. 2, 1866.

Witnesses                                               Inventor
Jas. A. Service                                         H. T. Woodman
J. W. B. Covington                                      per Munn & Co.
                                                        Attorneys

UNITED STATES PATENT OFFICE.

H. T. WOODMAN, OF DUBUQUE, IOWA.

IMPROVEMENT IN FILTER AND COOLER COMBINED.

Specification forming part of Letters Patent No. 58,530, dated October 2, 1866.

*To all whom it may concern:*

Be it known that I, H. T. WOODMAN, of Dubuque, in the county of Dubuque and State of Iowa, have invented a new and Improved Water Cooler and Filter Combined; and I do hereby declare that the following is a full, clear, and exact description thereof, which will enable others skilled in the art to make and use the same, reference being had to the accompanying drawings, forming part of this specification, in which—

Figure 1:
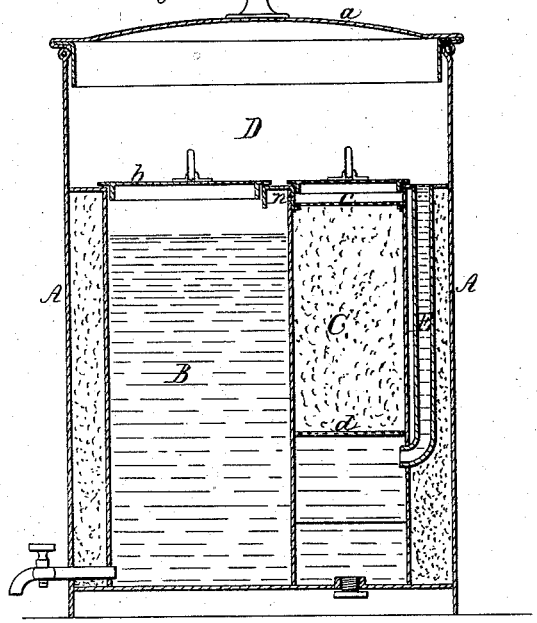
Figure 2:
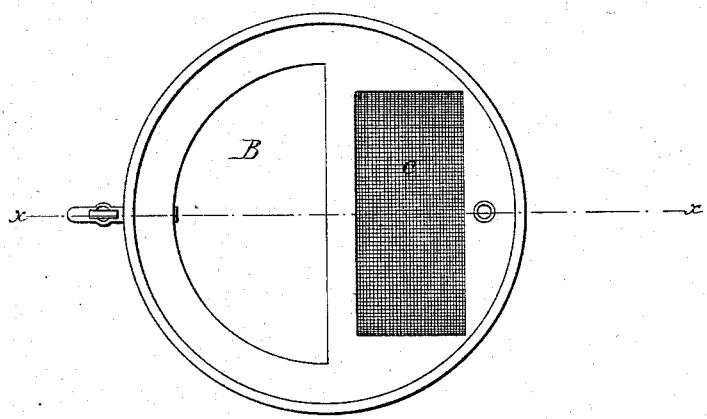

Figure 1 is a longitudinal vertical section of my invention, taken on the line *x x*, Fig. 2. Fig. 2 is a top view of the apparatus, the lid having been removed.

Similar letters of reference indicate like parts.

My invention consists in the combination of a filtering device with a water-cooler, in such manner that the water used may be filtered before it is allowed to pass into the drawing-off chamber of the apparatus.

A designates the outside walls of the apparatus, which apparatus is provided with a lid, *a*, in the usual manner. B represents a water-cooling chamber, which occupies a larger portion of the interior of the apparatus, extending from its bottom up to within a certain distance of its top. This is provided with a cover, *b*, as shown in Fig. 1. On one side of this water-cooling chamber is located the filtering device C, which is provided at its top with a perforated plate or diaphragm, *c*, and lower down, toward its bottom, with a similar plate, *d*, the space between these two plates containing charcoal or any other suitable filtering medium.

An aperture, *n*, at the top of the filtering device C, communicates with the chamber B. The part of the apparatus above the water-cooling chamber B and filtering device C constitutes a receiving and supplementary cooling-chamber, D, into which the water to be filtered is poured; and leading from this chamber to the lower part of the filtering device is a pipe, E.

The bottom of the filtering device C is provided with a screw-plug for drawing off any mud or sediment which may collect in the bottom of the said filtering device.

The apparatus can be better understood by describing its operation, which is as follows: Water, on being poured into the chamber D, passes through the pipe E into the lower portion of the filtering device; from thence up through the perforated plate *d*. It then passes through the filtering medium, and from thence through the plate *e*, and from thence, through the pipe *n*, into the water-cooling chamber B, from which it is drawn off by a faucet in the usual way.

It is to be observed that the filtering device is always kept filled with water, even after the chambers A and D are emptied, so that the filtering-chamber gives forth water at once to the chamber B, on water being poured into the chamber D. By this arrangement I combine a water-cooler and a water-filtering device in one apparatus, the size of which need not be greater than water-coolers as ordinarily constructed.

What I claim as new, and desire to secure by Letters Patent, is—

The arrangement of the water-chamber B, filter C, with top and bottom perforated plates *c d*, pipe *n*, receiving and supplementary chamber D, and pipe E, with walls A, constructed and operating in the manner and for the purpose specified.

H. T. WOODMAN.

Witnesses:
ABRAM WILLIAMS,
GEO. BURDEN.